(12) United States Patent
Hagiwara et al.

(10) Patent No.: US 6,597,979 B2
(45) Date of Patent: Jul. 22, 2003

(54) LOCK-UP CONTROL SYSTEM FOR AUTOMATIC TRANSMISSION

(75) Inventors: Yoshichika Hagiwara, Kanagawa (JP); Shinya Toyoda, Kanagawa (JP); Toru Urasawa, Kanagawa (JP); Atsufumi Kobayashi, Kanagawa (JP)

(73) Assignees: Jatco Ltd, Fuji (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/041,762

(22) Filed: Jan. 10, 2002

(65) Prior Publication Data

US 2002/0091477 A1 Jul. 11, 2002

(30) Foreign Application Priority Data

Jan. 11, 2001 (JP) .................... 2001-003636

(51) Int. Cl.$^7$ ............... G06F 7/00; B60K 41/02
(52) U.S. Cl. ............... 701/67; 701/51; 477/166; 477/180
(58) Field of Search ............... 701/67, 68, 51, 701/52; 477/166, 180

(56) References Cited

U.S. PATENT DOCUMENTS 5,911,646 A * 6/1999 Tsutsui et al. ............... 477/93

FOREIGN PATENT DOCUMENTS

JP 59-43256 3/1984

* cited by examiner

*Primary Examiner*—Yonel Beaulieu
(74) *Attorney, Agent, or Firm*—Foley & Lardner

(57) ABSTRACT

A lock-up control system for an automatic transmission includes a torque converter and a lock-up clutch. The controller includes a lock-up control section. The lock-up control section includes a first lock-up releasing control section adapted to gradually disengage the lock-up clutch from an engaging state and put the lock-up clutch into a disengaging state when the accelerator pedal movement speed is not lower than a set speed and an initial accelerator pedal depression amount is not smaller than a set accelerator pedal depression amount to establish a driving condition of the vehicle under the engaging state of the lock-up clutch.

8 Claims, 7 Drawing Sheets

LOCK-UP CONTROL SYSTEM FOR AUTOMATIC TRANSMISSION

BACKGROUND OF THE INVENTION

This invention relates to improvements in a lock-up control system for an automatic transmission including a torque converter provided with a lock-up clutch.

Hitherto it has been well known that an automatic transmission provided with a lock-up clutch is mounted on an automotive vehicle. In the torque converter, when a difference in rotational speed is made between a torque converter power input shaft driven by an engine and an automatic transmission power input shaft, a torque increasing action is produced under the action of a stator. Accordingly, when the engine is operated at a vehicle starting or the like, a large rotational speed difference is produced between the torque converter power input shaft and the automatic transmission power input shaft thereby providing the torque increasing action under the action of the torque converter, thus obtaining a good vehicle starting characteristics.

However, when the rotational speed difference between the torque converter power input shaft and the torque converter power output shaft becomes small, for example, during a vehicle cruising at a constant vehicle speed, no torque increasing action can be made, so that the torque converter functions merely as a fluid coupling thereby lowering a torque transmission efficiency. In this regard, it has been employed to directly couple the power input and output shafts of the torque converter upon engagement of the lock-up clutch, i.e., to directly couple the engine and the automatic transmission, thereby preventing the torque transmission efficiency from lowering and improving fuel economy.

Even with the above lock-up clutch, the following problems have been encountered: The torque increasing action by the torque converter cannot be obtained in a lock-up condition in which the lock-up clutch is engaged, and therefore a response characteristics is degraded owing to torque shortage even if an acceleration operation is made by depressing an accelerator pedal in the lock-up condition.

In view of the above, a lock-up control technique is proposed and disclosed in Japanese Patent Provisional Publication No. 59-43256. This lock-up control technique is arranged as follows in order to solve the problems in which the torque increasing action cannot be employed and therefore no sufficient acceleration can be made if the lock-up condition is released when an accelerator pedal is depressed to make a rapid acceleration during a vehicle running in the lock-up condition: A section for detecting a movement speed of an accelerator pedal is provided. Additionally, a lock-up releasing section is provided to output a signal for causing the lock-up clutch to be compulsorily disengaged when the accelerator pedal movement speed is not lower than a predetermined level. Under the action of these sections, the lock-up condition is immediately released regardless of running conditions of the vehicle when a rapid acceleration is made. This generates a rotational speed difference between the engine and the torque converter power output shaft thereby providing the torque increasing action, thus effectively using the torque converter to make a sufficient acceleration.

SUMMARY OF THE INVENTION

Figure 8:
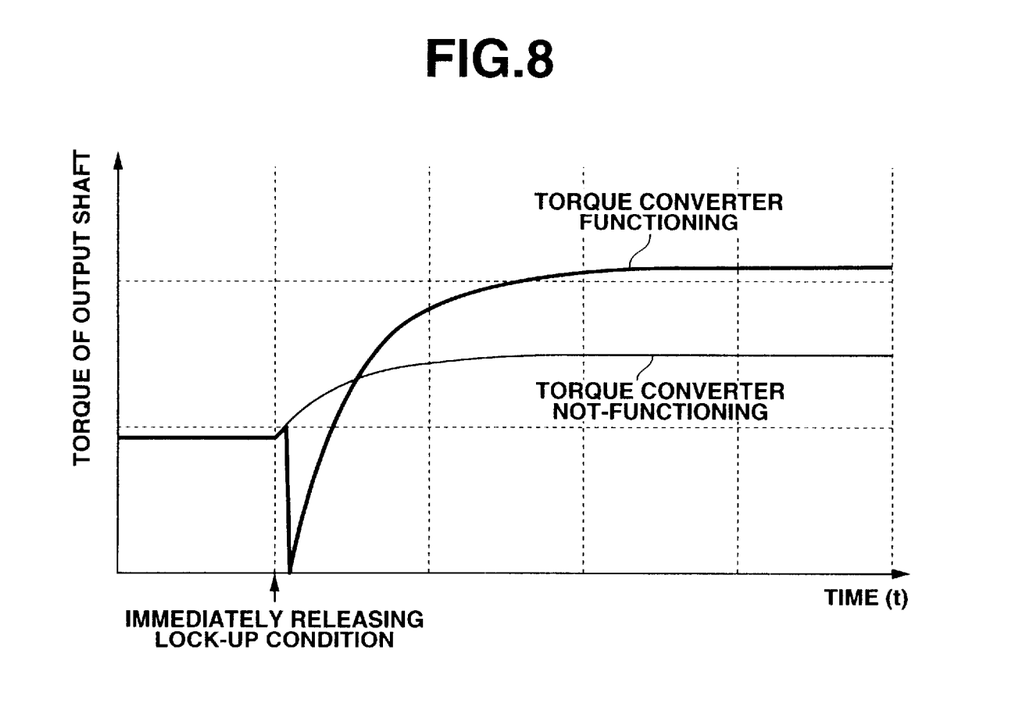
FIG. 8 is a time chart showing the torque characteristics of the transmission power output shaft in case that the lock-up condition is immediately released in a driving condition of the vehicle, used in the lock-up control of a conventional lock-up control technique.

However, drawbacks have been encountered even in the above lock-up control technique. That is, during a low speed vehicle running (for example, at a vehicle speed of 20 to 40 km/h) upon depression of the accelerator pedal by the driver in the lock-up condition of the torque converter, if the driver further depresses the accelerator pedal intending an acceleration, the lock-up condition is immediately released. As a result, the path of torque transmission from the engine is momentarily interrupted thereby generating a large depression shock (due to sudden lowering in torque of the power output shaft of the transmission). This will be discussed in detail with reference to FIG. 8 which is a time chart of the torque characteristics of the transmission power output shaft, obtained when an accelerator pedal is further depressed to make an acceleration in a driving condition in which the accelerator pedal has been depressed by the driver under the lock-up condition of the torque converter. In the time chart, a thin line indicates the torque characteristics obtained when the lock-up condition is maintained, demonstrating the fact that the driver's acceleration requirement cannot be met since a rising response of the transmission output shaft torque is low while the maximum level of the output shaft torque is low. The thick line indicates the torque characteristics obtained when the lock-up condition is immediately released, demonstrating the fact that the output shaft torque abruptly lowers when the lock-up condition is released, and thereafter the output shaft torque abruptly rises thereby producing the large depression shock.

It is, therefore, an object of the present invention is to provide an improved lock-up control system for an automatic transmission, which can effectively overcome drawbacks encountered in conventional lock-up systems and techniques for an automatic transmission.

Another object of the present invention is to provide an improved lock-up control system for an automatic transmission, which can effectively meet a driver's acceleration requirement while suppressing the feeling of a depression shock due to immediately releasing a lock-up condition of a torque converter when an accelerator pedal is depressed during a vehicle running in a driving condition under a lock-up condition of the torque converter.

An aspect of the present invention resides in a lock-up control system for an automatic transmission including a torque converter having a power input element connected to an engine of a vehicle and a power output element connected to a power input shaft of the transmission, and a lock-up clutch housed in the torque converter and being capable of directly coupling the power input element and the power output element of the torque converter. The lock-up control system comprises an accelerator pedal depression amount sensor for detecting a depression amount of an accelerator pedal, and a controller. The controller includes an accelerator pedal movement speed calculating section for calculating a movement speed of the accelerator pedal. The controller includes a lock-up control section adapted to disengage the lock-up clutch in a condition in which a driving point of the vehicle is within a lock-up condition releasing region in a set lock-up schedule, and to engage the lock-up clutch in a condition in which the driving point is within a lock-up condition applying region. The lock-up control section includes a first lock-up releasing control section adapted to gradually disengage the lock-up clutch from an engaging state and put the lock-up clutch into a disengaging state when the accelerator pedal movement speed is not lower than a set speed and an initial accelerator pedal depression amount in the accelerator pedal depression amount is not smaller than a set accelerator pedal depression amount to establish a driving condition of the vehicle under the engaging state of the lock-up clutch.

Another aspect of the present invention resides in a lock-up control system for an automatic transmission including a torque converter having a power input element connected to an engine of a vehicle and a power output element connected to a power input shaft of the transmission, and a lock-up clutch housed in the torque converter and being capable of directly coupling the power input element and the power output element of the torque converter. The lock-up control system comprises means for detecting a depression amount of an accelerator pedal, means for calculating a movement speed of the accelerator pedal; and lock-up control means for disengaging the lock-up clutch in a condition in which a driving point of the vehicle is within a lock-up condition releasing region in a set lock-up schedule, and for engaging the lock-up clutch in a condition in which the driving point is within a lock-up condition applying region. The lock-up control means includes a first lock-up releasing control section adapted to gradually disengage the lock-up clutch from an engaging state and put the lock-up clutch into a disengaging state when the accelerator pedal movement speed is not lower than a set speed and an initial accelerator pedal depression amount in the accelerator pedal depression amount is not smaller than a set accelerator pedal depression amount to establish a driving condition of the vehicle under the engaging state of the lock-up clutch.

A further aspect of the present invention resides in a method of controlling lock-up for an automatic transmission including a torque converter having a power input element connected to an engine of a vehicle and a power output element connected to a power input shaft of the transmission, and a lock-up clutch housed in the torque converter and being capable of directly coupling the power input element and the power output element of the torque converter. The lock-up controlling method comprises (a) detecting a depression amount of an accelerator pedal; (b) calculating a movement speed of the accelerator pedal; and (c) disengaging the lock-up clutch in a condition in which a driving point of the vehicle is within a lock-up condition releasing region in a set lock-up schedule, and engaging the lock-up clutch in a condition in which the driving point is within a lock-up condition applying region. The disengaging and disengaging the lock-up clutch (c) includes gradually disengaging the lock-up clutch from an engaging state and put the lock-up clutch into a disengaging state when the accelerator pedal movement speed is not lower than a set speed and an initial accelerator pedal depression amount in the accelerator pedal depression amount is not smaller than a set accelerator pedal depression amount to establish a driving condition of the vehicle under the engaging state of the lock-up clutch.

DETAILED DESCRIPTION OF THE INVENTION

Figure 1:
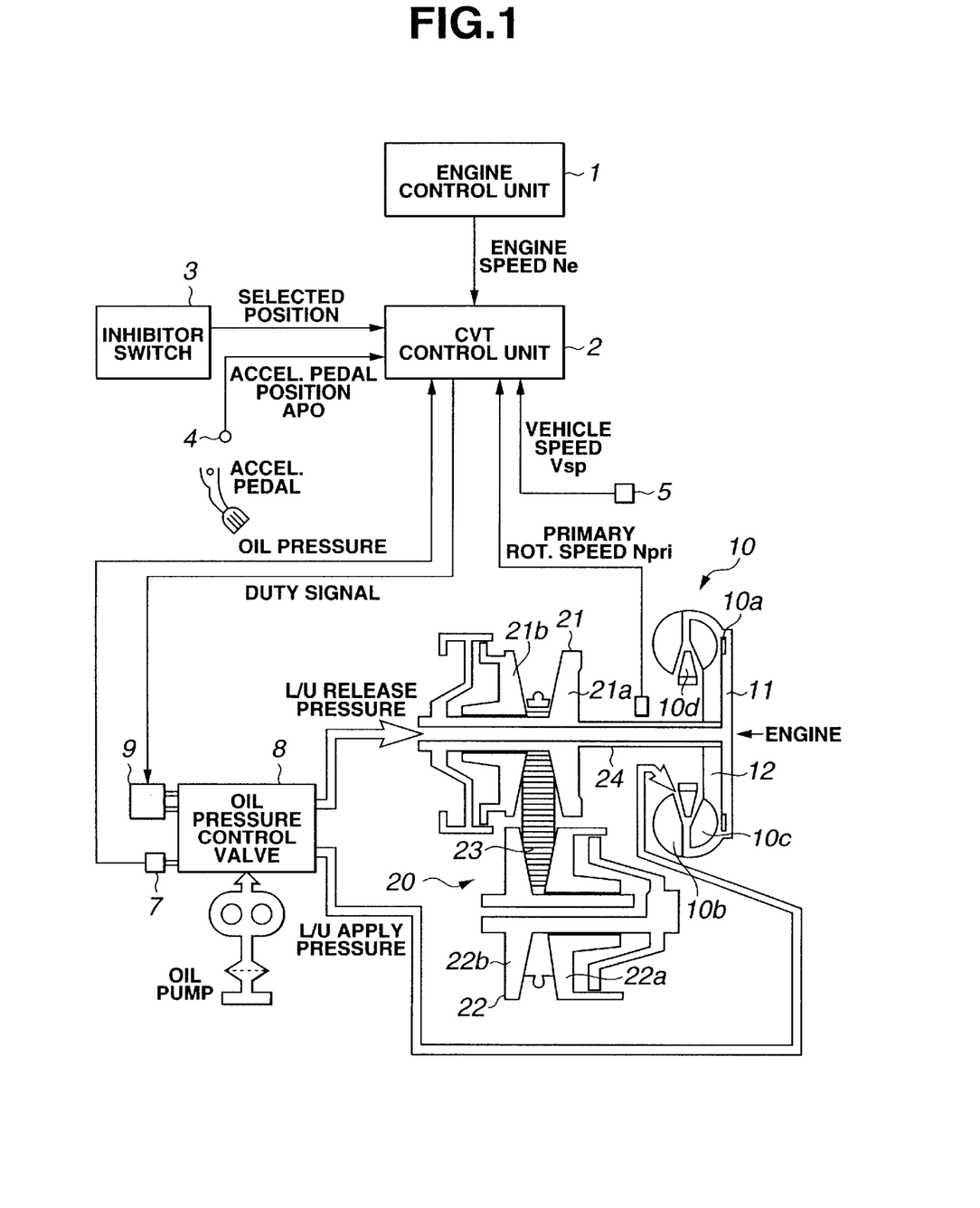
FIG. 1 is a schematic illustration of an embodiment of a lock-up control system for an automatic transmission, according to the present invention.

Referring now to FIG. 1 of the drawings, an embodiment of a lock-up control system for an automatic transmission, according to the present invention is illustrated as being incorporated with an internal combustion engine (not shown) of an automotive vehicle. The engine is provided with an engine control unit 1 for controlling operation of the engine. The engine control unit 1 is electrically connected to a CVT control unit (controller) 2 for controlling operation of a belt-type continuously variable transmission (CVT) 20. The engine control unit 1 has a function to generate an engine speed signal representative of an engine speed Ne of the engine, and to output the engine speed signal to the CVT control unit 2. An inhibitor switch 3 is provided to detect a selected position of a selector lever (not shown), selected by a driver, and produce a selected position signal representative of the selector lever selected position. The inhibitor switch 3 is electrically connected to the CVT control unit 2 and adapted to output the selected position signal to the CVT control unit 2. An accelerator pedal position or depression amount (throttle valve opening degree) sensor 4 is provided to detect a position or depression amount of an accelerator pedal, i.e., an opening degree of a throttle valve of the engine and adapted to produce an accelerator pedal position or depression amount signal representative of the accelerator pedal position or depression amount. The accelerator pedal position sensor 4 is electrically connected to the control unit 2 to output the accelerator pedal position or depression amount signal to the control unit 2. Additionally, a vehicle speed sensor 5 is provided to detect a vehicle speed Vsp of the automotive vehicle and adapted to produce a vehicle speed signal representative of the vehicle speed. The vehicle speed sensor 5 is electrically connected to the control unit 2 to output the vehicle speed signal to the control unit 2.

The belt-type continuously variable transmission 20 includes a torque converter 10 through which a rotational driving force from the engine is transmitted to a transmission power input shaft 24. A primary pulley 21 is mounted on the transmission power shaft 24 and includes an axially fixed wheel counterpart 21a and an axially movable wheel counterpart 21b. The rotational driving force is transmitted through a belt 23 to a secondary pulley 22 which is mounted on a transmission power output shaft (no numeral) and includes an axially movable wheel counterpart 22a and an axially fixed wheel counterpart 22b. The torque converter 10 includes a lock-up clutch 10a which is adapted to directly couples the torque converter output to the engine drive. The torque converter 10 includes a pump (power input element) 10b, a turbine 10c (power output element), and a stator 10d. It will be understood that the pump 10b and the turbine 10c can be directly coupled by the lock-up clutch 10a. A primary rotational speed sensor 6 is provided to detect a rotational speed Npri of the primary pulley 21 or of the transmission power input shaft 24. The primary pulley rotational speed sensor 6 is adapted to produce a primary pulley rotational speed signal representative of the primary pulley rotational speed Npri, and electrically connected to the CVT control unit 2 to output the primary pulley rotational speed signal to the control unit 2.

An oil pressure control valve 8 is provided to control an oil pressure supplied from an oil pump. An oil pressure sensor 7 is provided to the oil pressure control valve 8 so as to detect the oil pressure supplied to the oil pressure control valve 8. The oil pressure sensor 7 is adapted to generate an oil pressure signal representative of the oil pressure and is electrically connected to the CVT control unit 2 to output the oil pressure signal to the CVT control unit 2. The CVT control unit 2 is arranged to control a transmission ratio of the CVT. The CVT control unit 2 is further arranged to output a solenoid duty signal to a lock-up pressure solenoid (or lock-up control actuator) 9 which is adapted to control engagement and disengagement of the lock-up clutch 10a provided in the torque converter 10. The lock-up pressure solenoid 9 produces a differential pressure control pressure which is applied to a differential pressure control valve (not shown) in the oil pressure control valve 8, in accordance with the solenoid duty signal. The differential pressure control valve in the oil pressure control valve 8 is adapted to supply a lock-up (L/U) apply pressure to a lock-up (L/U) apply pressure chamber 12 and a lock-up release pressure to a lock-up release pressure chamber 11. This produces a differential pressure in the lock-up clutch 10a thereby accomplishing control of engaging and releasing of the lock-up clutch 10a.

Operation of the above lock-up control system will be discussed hereinafter.

Processing of Lock-Up Control.

A lock-up control processing executed by the CVT control unit 2 will be discussed in detail with reference to a flowchart shown in FIGS. 2 and 3.

At a step S101 in the flowchart, a control flag representing a current lock-up control is read. Specifically, this lock-up control uses a slow smooth lock-up OFF processing flag, a quick smooth lock-up OFF processing flag, an immediate lock-up OFF processing flag, a lock-up condition maintaining processing flag, a torque converter condition maintaining processing flag, and a smooth lock-up ON processing flag. The slow smooth lock-up OFF processing flag is a flag for accomplishing the processing of slowly and smoothly releasing a lock-up condition of the torque converter 10 (referred to as "Slow smooth L/U (lock-up)-OFF processing"). The quick smooth lock-up OFF processing flag is a flag for accomplishing the processing of quickly and smoothly releasing the lock-up condition of the torque converter 10 (referred to as "Quick smooth LIU-OFF processing"). The immediate lock-up OFF processing flag is a flag for accomplish the processing of immediately releasing the lock-up condition of the torque converter 10 (referred to as "Immediate L/U-OFF processing"). The lock-up condition maintaining processing flag is a flat for accomplishing the processing of maintaining the lock-up condition of the torque converter 10 (referred to as "L/U condition maintaining processing"). The torque converter condition maintaining processing flag is a flag for accomplishing the processing of maintaining a torque converter (T/C) condition which is established upon disengagement of the lock-up clutch so as to allow the torque converter 10 to function as a torque converter (referred to as "Torque converter (T/C) condition maintaining processing"). The smooth lock-up ON processing flag is a flag for accomplishing the processing of smoothly establishing the lock-up condition of the torque converter 10 (referred to as "Smooth L/U-OFF processing"). Accordingly, such flags are read in this step S101.

At a step S102, a decision is made as to which state the lock-up clutch is currently in, in accordance with the flag read in the step S101. When the lock-up clutch 10a is kept in an engaging state (ON) where the lock-up condition (referred to as "L/U condition") of the torque converter is maintained, a flow goes to a step S104. When the lock-up clutch is kept in a disengaging state (OFF) where the torque converter condition (referred to as "T/C condition") is maintained while releasing the lock-up condition, the flow goes to a step S116. When the lock-up clutch is maintained in a state for accomplishing the processing of smoothly establishing or releasing the lock-up condition (referred to as "smooth L/U-ON or L/U-OFF"), the flow goes to a step S103.

At the step S103, the state for accomplishing the processing of smoothly establishing or releasing the lock-up condition is maintained, and the flow returns to the step S101.

At a step S104, the current vehicle speed Vsp is read.

Figure 4A:
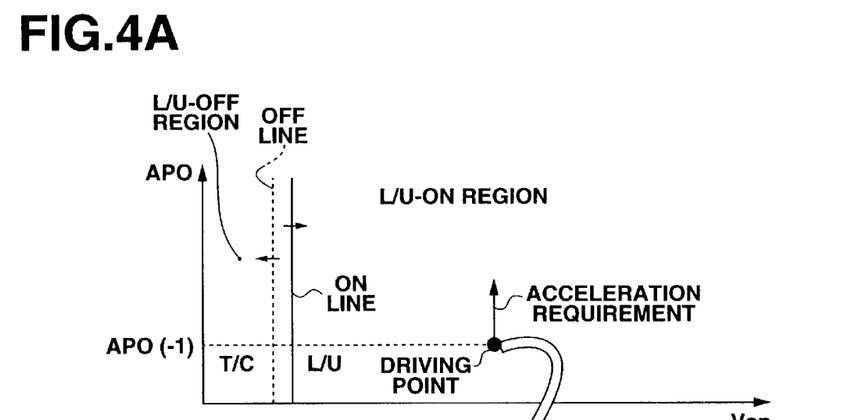
FIG. 4A is a graphical representation showing a lock-up schedule used in the lock-up control in FIGS. 2 and 3.

At a step S105, a decision is made as to whether the lock-up condition is established (referred to as "LIU-ON") or released (referred so as "L/U-OFF") in accordance with a driving point corresponding to the current vehicle speed Vsp and a lock-up schedule as shown in FIG. 4A. In FIG. 4A, the lock-up condition is released from an OFF line and within a L/U-OFF (lock-up condition releasing) region; and the lock-up condition is established from an ON line and with a L/U-ON (lock-up condition establishing or applying) region. The torque converter is in the torque converter condition in a region represented by T/C, and in the lock-up condition in a region represented by L/U. When the lock-up condition is established, the flow goes to a step S106. When the lock-up condition is released, the flow goes to a step S120.

At the step S106, the current accelerator pedal position or depression amount (throttle valve opening degree) APO (0) is read.

At the step S107, the initial accelerator pedal position or depression amount (throttle valve opening degree) APO(−1) made before Δt second relative to making of APO(0) is read. The initial accelerator pedal position or depression amount is established before Δt second relative to establishment of the current accelerator depression amount APO(0).

At a step S108, an accelerator pedal movement speed ΔAPO is calculated by the following equation:

$$\Delta APO = APO(0) - APO(-1)$$

At a step S109, a decision is made as to whether the accelerator pedal movement speed ΔAPO is not lower than a control initiation movement speed (or the movement speed at which a control is initiated) α or not. When ΔAPO≧α, the flow goes to a step S110 to permit the control. When ΔAPO<α, the flows goes to a step 121 to inhibit the control, i.e., to maintain the lock-up condition.

At the step S110, the primary rotational speed Npri of the primary pulley of the continuously variable transmission (CVT) is read.

At a step S111, a decision is made as to whether the primary rotational speed Npri is lower than a set primary rotational speed β (for example, a value around 2000 rpm) or not. When Npri<β, the flow goes to a step S112 to permit the control. When Npri≧β, the flow goes to the step S121 to inhibit the control.

At the step S112, the initial accelerator pedal position or depression amount APO(−1) is read.

At a step S113, a decision is made as to whether the vehicle is in a coasting condition or a driving condition at the initial accelerator pedal position or depression amount, in accordance with APO(−1)≧a set driving accelerator pedal position or depression amount (the throttle valve opening degree) γ representing a state of the driving condition of the vehicle. When APO(−1)<γ, a result of the decision is such that the vehicle is in the coasting condition and therefore the flow goes to a step S115. When APO(−1)≧γ, a result of the decision is such that the vehicle is in the driving condition and therefore the flow goes to a step S114.

At the step S114, the processing of accomplishing the processing of quickly and smoothly releasing the lock-up condition of the lock-up clutch is accomplished, indicating the differential pressure in the lock-up clutch and setting the control flag.

At the step S115, the processing of immediately releasing the lock-up condition of the torque converter is accomplished, indicating the differential pressure in the lock-up clutch and setting the control flag.

At the step S116, the current vehicle speed Vsp is read.

At a step S117, a decision is made as to whether the lock-up condition is established or released in accordance with the driving point corresponding to the current vehicle speed Vsp and the lock-up schedule as shown in FIG. 4A. When the lock-up condition is established, the flow goes to a step S119. When the lock-up condition is released, the flow goes to a step S118.

At the step S118, the processing of maintaining the torque converter condition is accomplished, indicating the differential pressure in the lock-up clutch and setting the control flag.

At the step S119, the processing of smoothly establishing the lock-up condition of the lock-up clutch is accomplished, indicating the differential pressure in the lock-up clutch and setting the control flag.

At a step S120, the processing of slowly and smoothly releasing the lock-up condition of the torque converter is accomplished indicating the differential pressure in the lock-up clutch and setting the control flag, when the decision at the step S105 makes a result that the lock-up condition is released.

At the step S121, the processing of maintaining the lock-up condition of the torque converter is accomplished indicating the differential pressure in the lock-up clutch and setting the control flag, when the decision at the step S109 makes the result of ΔAPO<α, or when the decision at the step S111 makes the result of Npri≧β.

At a step S122, a duty ratio is calculated. A signal (solenoid duty signal) of this duty ratio is supplied to the lock-up pressure solenoid 9.

At a step S123, the control of engagement and disengagement of the lock-up clutch 10a is accomplished by a duty control which is made on the lock-up pressure solenoid 9 in accordance with this duty ratio. Specifically, in accordance with the duty ratio, the lock-up pressure solenoid 9 produces a differential pressure control pressure which is then supplied to the differential pressure control valve in the oil pressure control valve 8. Then, in accordance with the differential pressure control pressure, the differential pressure control valve in the oil pressure control valve 8 supplies the lock-up apply pressure to the lock-up apply pressure chamber 12 and the lock-up release pressure to a lock-up release pressure chamber 11. This applies the differential pressure into the lock-up clutch 10a thereby accomplishing control of engaging and disengagement of the lock-up clutch 10a.

Figure 4B:
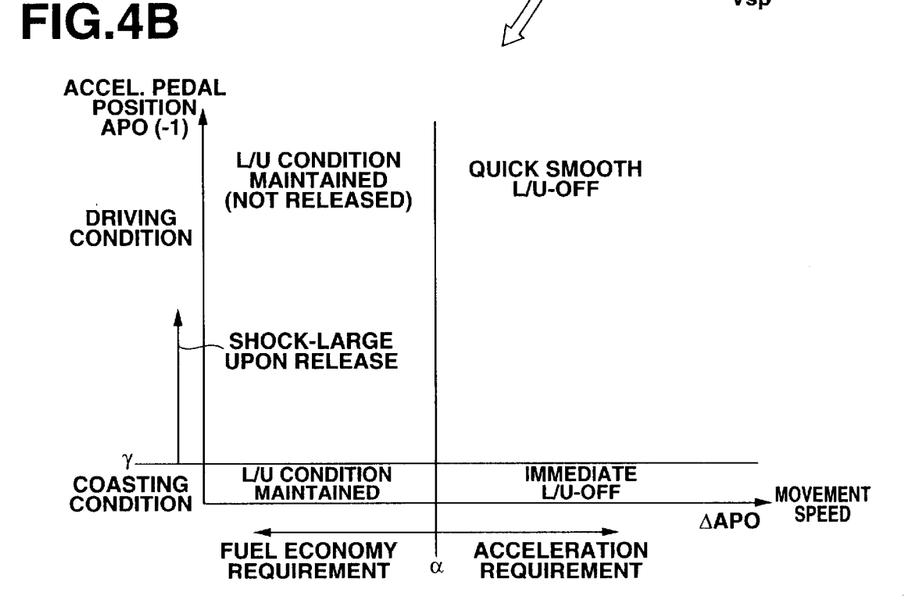
FIG. 4B is a graphical representation showing a manner of the lock-up control in terms of an initial accelerator pedal position and an accelerator pedal movement speed, used in the lock-up control in FIGS. 2 and 3.

Thus, according to the above processing, the torque converter is controlled in accordance with the initial accelerator pedal position or depression amount APO(−1) and the accelerator pedal movement speed ΔAPO as shown in FIG. 4B in which a region of maintaining the lock-up condition (indicated by "L/U condition maintained"), a region of quickly and smoothly releasing the lock-up condition (indicated by "Quick smooth L/U-OFF"), and a region of immediately releasing the lock-up condition ("Immediate L/U-OFF") are defined.

[Processing of Normal Releasing for the Lock-Up Condition]

Figure 2:
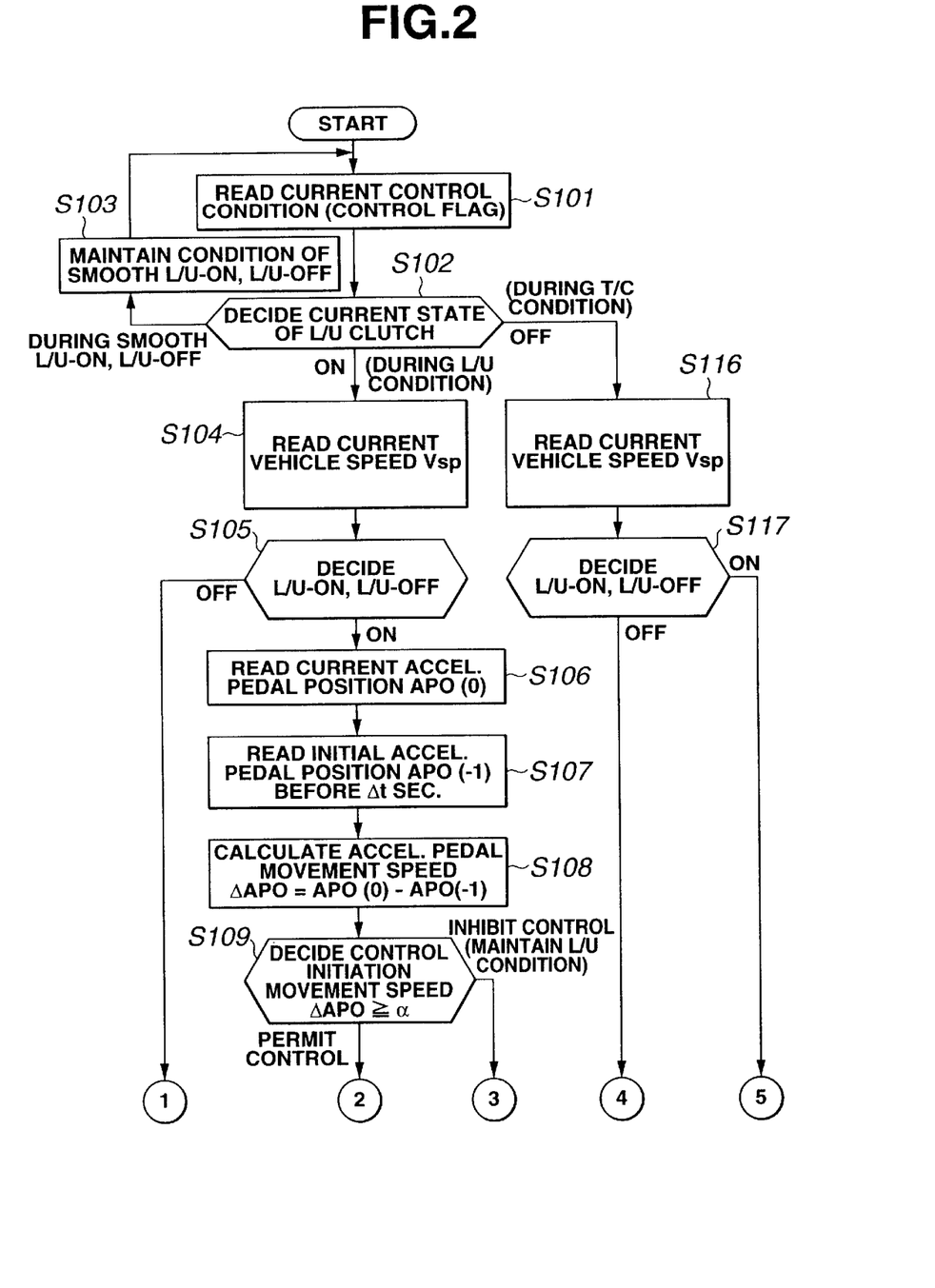
FIG. 2 is a former part of a flowchart of a lock-up control executed by a CVT control unit in the lock-up control system of FIG.
Figure 3:
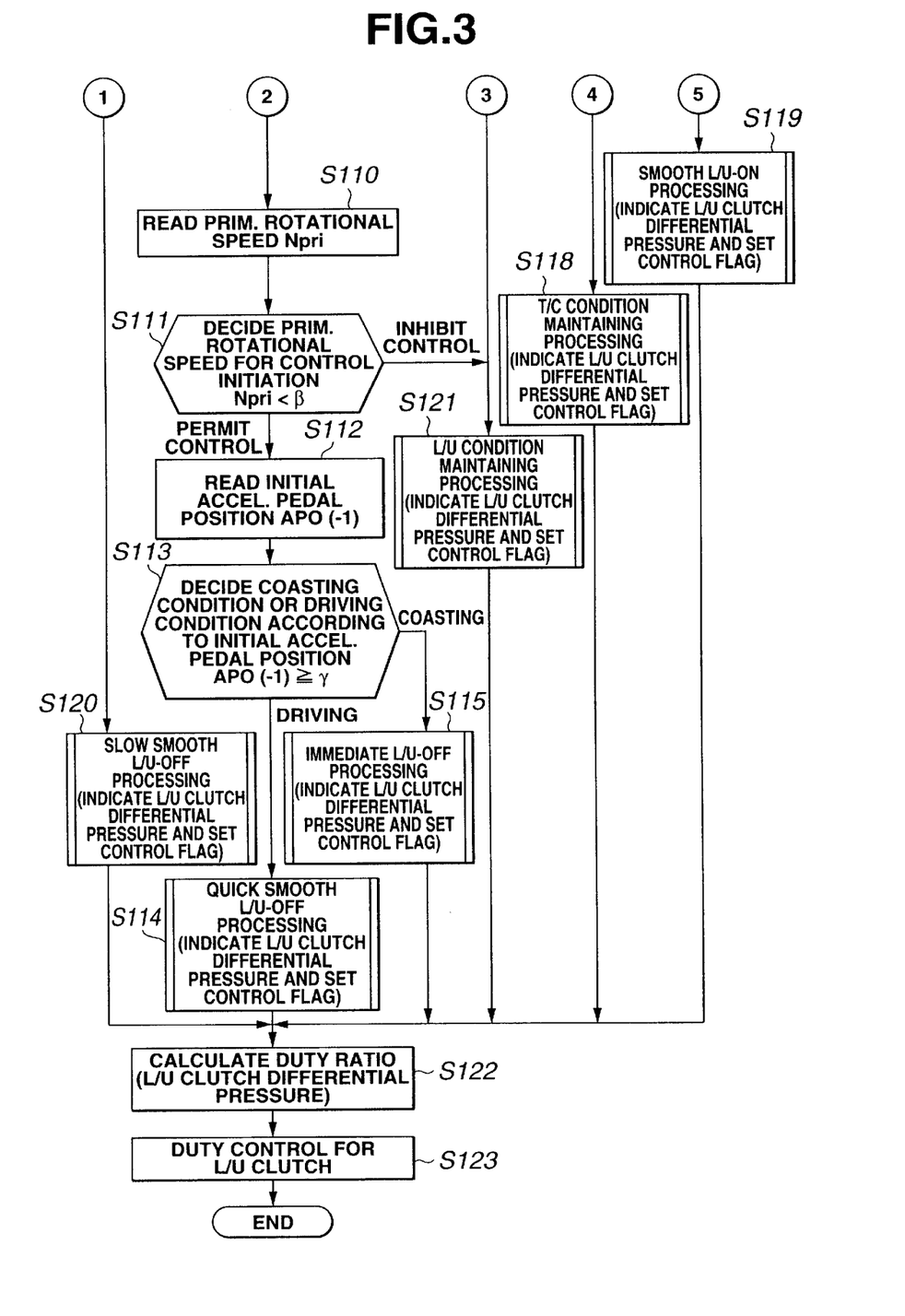
FIG. 3 is a latter part of the flowchart of the lock-up control executed by the CVT control unit in the lock-up control system of FIG. 1.

During a normal releasing for the lock-up condition, in FIGS. 2 and 3, the flow goes in the direction of the step S101, the step S102, the step S104, the step S105 and the step S120. At the step S120, the processing for slowly and smoothly releasing the lock-up condition is accomplished.

Figure 5A:
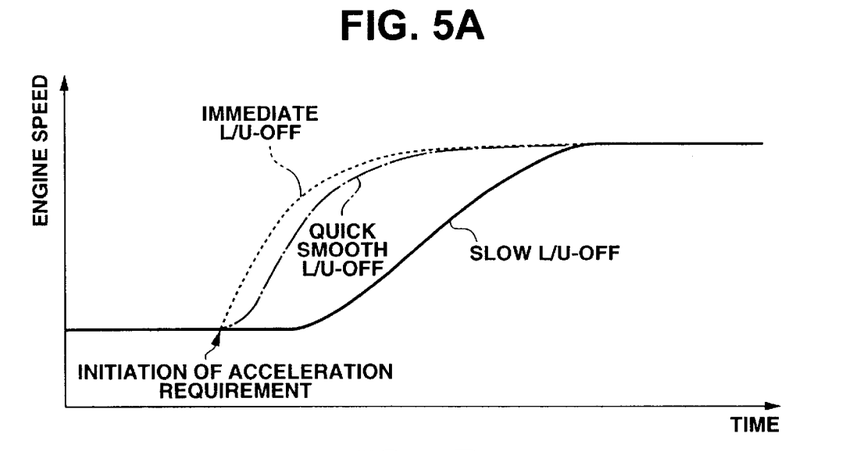
FIGS. 5A–5C are time chart of the lock-up control in FIGS. 2 and 3 in comparison with other lock-up controls.
Figure 5B:
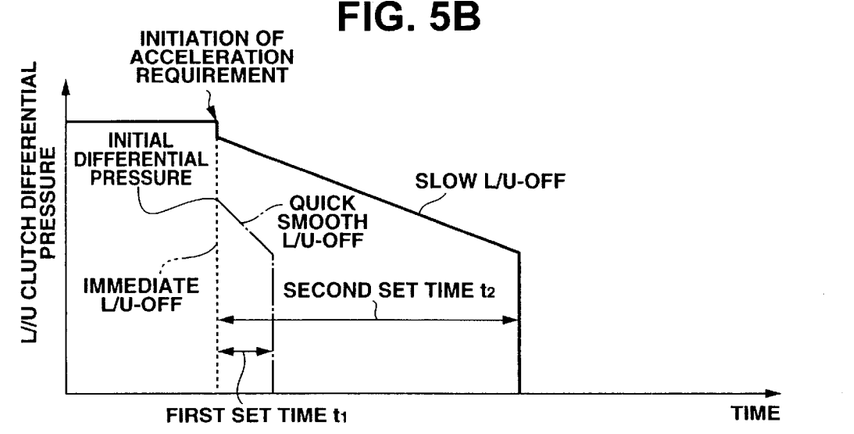
Figure 5C:
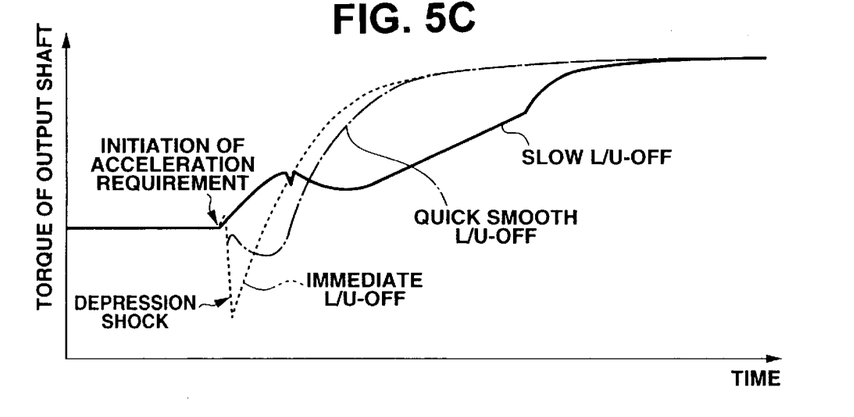

If, for example, the control of the processing of immediately releasing the lock-up condition is accomplished in the control of the normal releasing for the lock-up condition, a large shock will be generated. Even if the control of releasing the lock-up condition for a short first set time t1 (required from initiation to termination of disengagement of the lock-up clutch) to secure an acceleration response, the shock due to the lock-up condition releasing cannot be sufficiently suppressed as shown in FIG. 5. Further, if the lock-up condition is released for a short time, the lock-up condition establishing region is substantially narrowed thereby to lower a fuel economy.

Accordingly, for the normal lock-up condition releasing, a control is carried out in accordance with the lock-up schedule so that a prompt acceleration is not desired, and therefore the lock-up condition release control is carried out for a second set time t2 longer than the first set time t1, as shown in FIG. 5.

Processing of Inhibition of Lock-Up Condition Releasing Control in Response to Acceleration Requirement.

When the lock-up condition of the lock-up clutch is established and the accelerator pedal is depressed in a manner that the acceleration pedal movement (depression) speed is relatively low, the flow goes in the direction of the step S101, the step S102, the step S104, the step S105, the step S106, the step S107, the step S108, the step S109 and the step S121 in the flowchart of FIGS. 2 and 3. At the step S121, ΔAPO<α is established and therefore a decision is made such that a requirement for acceleration is weak or low, so that the processing of maintaining the lock-up condition is accomplished.

When the lock-up condition of the torque converter is established and the accelerator pedal is depressed in which the primary rotational speed Npri is higher than the set primary rotational speed β to make a high speed vehicle running or the like, the flow goes in the direction of the step S101, the step S102, the step S104, the step S105, the step S106, the step S107, the step S108, the step S109, the step S110, the step S111 and the step S121 in the flowchart of FIGS. 2 and 3. At the step S121, a decision is made such that a torque increasing action by the torque converter 10 cannot be expected even though the lock-up condition is released, so that the processing of maintaining the lock-up condition is accomplished.

Accordingly, in a range of Npri≧β in which it is estimated from the speed ratio (=the rotational speed of the turbine/the rotational speed of the pump) S of the torque converter 10 that a high speed ratio is obtained, a control for releasing the lock-up condition is inhibited thereby preventing a fuel economy from lowering owing to making a useless lock-up condition releasing control.

[Processing of Lock-Up Condition Releasing Control from Coasting Condition]

When the accelerator pedal is depressed from or in the coasting condition in which the accelerator pedal is not depressed, in the lock-up condition of the torque converter, the flow goes in the direction of the step S101, the step S102, the step S104, the step S105, the step S106, the step S107, the step S108, the step S109, the step S110, the step S111, the step S112, the step S113 and the step S115. At the step S115, the processing of immediately releasing the lock-up condition is accomplished.

Figure 7:
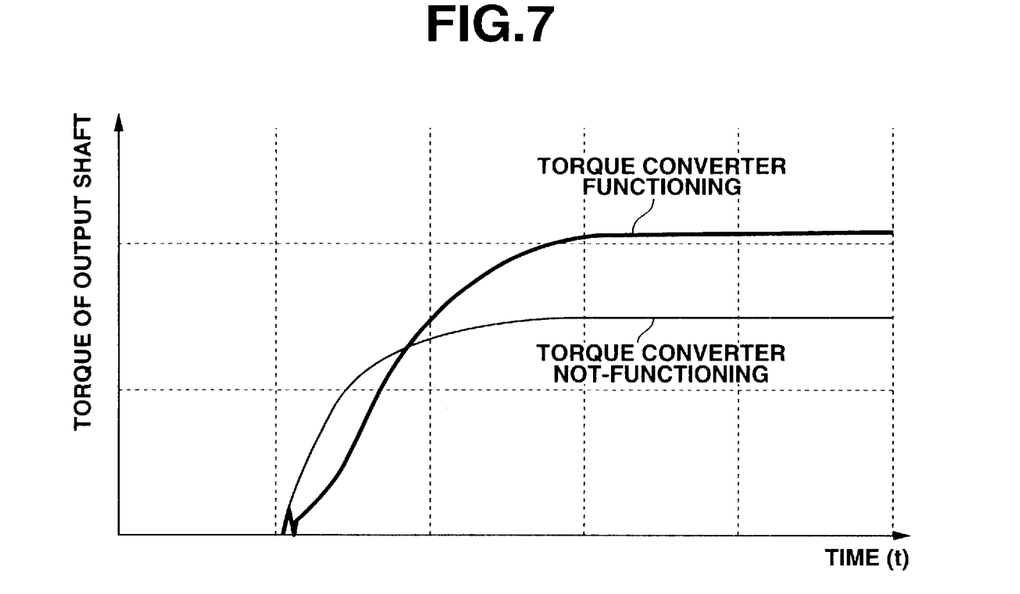
FIG. 7 is a time chart showing the torque characteristics of the transmission power output shaft in case that the lock-up condition is immediately released in a coasting condition of the vehicle, used in the lock-up control in FIGS. 2 and 3.

In other words, during the vehicle running in the coasting condition in which no depression is made on the accelerator pedal owing to separation of the driver's foot from the accelerator pedal, an input torque is hardly supplied from the engine to the torque converter, so that a depression shock cannot be generated even if the lock-up clutch 10a is immediately disengaged in contrast with that during the vehicle running in the driving condition, as shown in FIG. 7. In FIG. 7, thin and thick lines indicate respectively variations in torque of the transmission power output shaft upon lapse of time (t) in case that the lock-up condition is maintained so that the torque converter does not function and another case that the lock-up condition is immediately released so that the torque converter functions, occurred when the accelerator pedal is depressed during the vehicle running in the coasting condition.

Thus, when the accelerator pedal is depressed during the vehicle running in the coasting condition upon the lock-up condition of the torque converter 10, a torque increasing action of the torque converter 10 can be exhibited at a high response upon immediately releasing the lock-up condition. This provides a high acceleration performance meeting the driver's acceleration requirement.

Processing of Lock-Up Condition Releasing Control from Driving Condition.

When the accelerator pedal is depressed from or in the driving condition in which the accelerator pedal is depressed, in the lock-up condition of the lock-up clutch, the flow goes in the direction of the step S101, the step S102, the step S104, the step S105, the step S106, the step S107, the step S108, the step S109, the step S110, the step S111, the step S112, the step S113 and the step S114. At the step S114, the processing of quickly and smoothly releasing the lock-up condition is accomplished.

In other words, if the lock-up condition of the lock-up clutch 10a is immediately released in the driving condition and when the vehicle running is in a condition in which the driver's requirement for acceleration is strong or high, a depression shock is unavoidably generated. However, feeling of the depression shock can be suppressed by gradually disengaging the lock-up clutch 10a, while the torque increasing action of the torque converter 10 can be utilized by disengaging the lock-up clutch 10a.

Thus, when the accelerator pedal is depressed during the vehicle running in the driving condition under the lock-up condition of the torque converter, the driver's requirement for acceleration can be met suppressing feeling of the depression shock due to the immediate release of the lock-up condition.

Processing of Quickly and Smoothly Releasing Lock-Up Condition.

At the step S114, a time required from the initiation of disengagement of the lock-up clutch to the termination of the disengagement is the first set time t1 for securing a good acceleration response. Additionally, a differential pressure decreasing (duty) command or solenoid duty signal is output to the lock-up pressure solenoid 9 which is adapted to control the differential pressure applied to the lock-up clutch 10a, thereby disengaging the lock-up clutch. The differential pressure decreasing duty command is generated in accordance with a preset initial differential pressure and a differential pressure decreasing rate.

Discussion for accomplishing the processing of quickly and smoothly releasing the lock-up condition will be discussed with reference to FIG. 5. An upper time chart in FIG. 5 shows the relationship between the time and the engine speed; a middle time chart shows the relationship between the time and the differential pressure in the lock-up clutch; and a lower time chart in FIG. 5 shows the relationship between the time and the torque of the transmission power output shaft. In FIG. 5, a dotted line represents the case of accomplishing the processing of immediately releasing the lock-up condition of the torque converter (indicated by "Immediate L/U-OFF"); a solid line represents the case of accomplishing the processing slowly and smoothly releasing the lock-up condition of the torque converter (indicated by "Slow and smooth L/U-OFF"); and a dot-dash line represents the case of accomplishing the processing of quickly and smoothly releasing the lock-up condition of the torque converter (indicated by "Quick and smooth L/U-OFF").

When the processing of slowly and smoothly releasing the lock-up condition is accomplished in order to disengage the lock-up clutch 10a, a response to the driver's acceleration requirement is unavoidably degraded though the feeling of the depression shock can be suppressed, as indicated by the transmission power output shaft torque characteristics represented by the solid line.

In contrast, when the processing of immediately releasing the lock-up condition is accomplished in order to disengage the lock-up clutch 10a, the large depression shock is generated similarly to the case of immediately releasing the lock-up condition, though a good response to the driver's acceleration requirement can be obtained, as indicated by the transmission power output shaft torque characteristics represented by the dotted line.

Contrary to the above two cases, when the processing of quickly and smoothly releasing the lock-up condition is accomplished in order to disengage the lock-up clutch 10a, a good torque-rising response to the driver's acceleration requirement can be obtained, as indicated by the transmission power output shaft torque characteristics represented by the dash-dot line.

Figure 6:
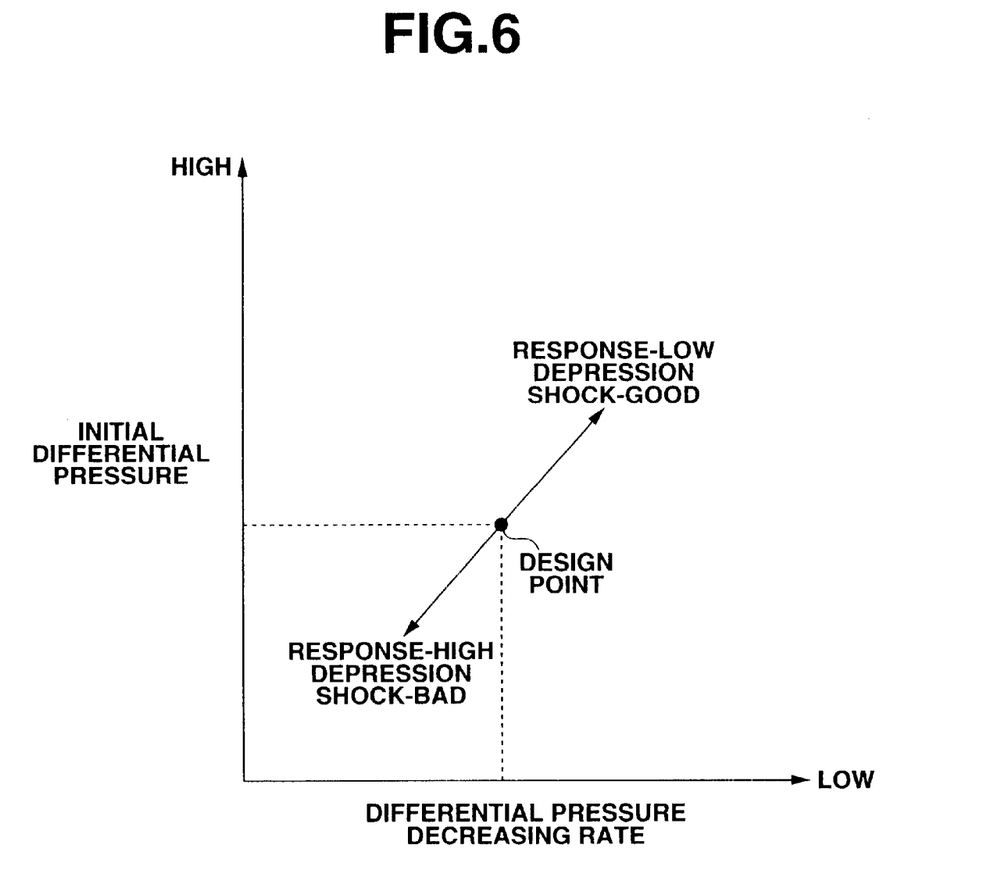
FIG. 6 is a graphical representation showing the variation in performance of the automatic transmission in terms of an initial differential pressure in a torque converter and a differential pressure decreasing rate, used in the lock-up control in FIGS. 2 and 3.

Specifically, the processing of quickly and smoothly releasing the lock-up condition of the torque converter is accomplished in the following manner: As shown in FIG. 6, the relationship between the performance of the response and the performance of the depression shock is derived from the initial differential pressure and the differential pressure decreasing rate. In accordance with this relationship, a design point at which a good (small) depression shock and a good acceleration response are compatible is previously set in terms of the initial differential pressure and the differential pressure decreasing rate. The initial differential pressure means the differential pressure (in the lock-up clutch) at the initial time of the processing of releasing the lock-up condition. The differential pressure decreasing rate means the rate in decrease of the differential pressure per unit time, during the processing of releasing the lock-up condition.

As a result of accomplishing the processing of releasing the lock-up condition employing the above design point, the control for disengagement of the lock-up clutch is carried out for the first set time t1 which provides a good acceleration response. This can make the good depression shock and the good acceleration response compatible.

Here, as indicated by the dot-dash line in FIG. 5, in the processing of quickly and smoothly releasing the lock-up condition, the differential pressure in the lock-up clutch is abruptly dropped to the initial differential pressure from the differential pressure in the lock-up condition, at the initial period of the control of releasing the lock-up condition. The reason for making such a control is that, by dropping the differential pressure to the low level at which the lock-up clutch 10a secures its slipping, the depression shock can be effectively suppressed within the short time (first set time t1) upon decreasing the differential pressure from the initial pressure. In other words, the driver's acceleration requirement can be met in a high response, suppressing the depression shock.

In contrast, in case that the differential pressure is gradually lowered from the level in the lock-up condition, slipping of the lock-up clutch is hardly made for a while so that a long time is required to complete releasing the lock-up condition. Therefore, the driver's acceleration requirement upon using the torque increasing action of the torque converter 10 cannot be met.

Next, advantageous effects of the above embodiment will be discussed.

As discussed above, according to the above embodiment, in the lock-up control system of the continuously variable transmission in which the transmission ratio is varied in a stepless manner, the lock-up schedule includes the lock-up condition releasing region ("L/U-OFF region") limited by a set vehicle speed within a vehicle starting range at which the vehicle makes its starting, and the lock-up condition establishing or applying region ("L/U-ON region") defined by vehicle speeds over the set vehicle speed regardless of the accelerator pedal depression amount (throttle valve opening degree). The driving point of the vehicle is defined by the vehicle speed detected by the vehicle speed sensor 5. When the driving point is brought into the lock-up condition releasing region from the lock-up condition establishing region in the lock-up schedule, the control of disengaging the lock-up clutch 10a is carried out. When the driving point is brought into the lock-up condition establishing region from the lock-up condition releasing region, the control of engaging the lock-up clutch 10a is carried out. Thus, the lock-up schedule is applied on the lock-up control for the continuously variable transmission having a wide lock-up condition establishing region and frequent requirements of acceleration in the lock-up condition, and therefore the driver's acceleration requirement can be effectively met by releasing the lock-up condition upon depression of the accelerator pedal while securing an improvement in fuel economy.

In other words, the continuously variable transmission in which the transmission ratio is varied in a stepless manner is prevented from occurrence of a shift shock occurred in a transmission having multiple stage gears. Accordingly, the torque converter 10 is used fundamentally to improve the acceleration characteristics at a vehicle starting in a low vehicle speed range. In other vehicle speed ranges, the lock-up condition of the torque converter is maintained thereby improving the fuel economy. In view of this, it has been conventionally pointed out as a problem that a response in acceleration is degraded owing to the fact that the torque increasing action cannot be utilized, when the accelerator pedal is depressed during a low vehicle speed running (at a vehicle speed ranging from 20 km/h to 40 km/h) in the lock-up condition. However, it is to be noted that, according to the present invention, such a problem can be solved.

While the lock-up control system for an automatic transmission has been described above by reference to a certain embodiment of the invention, it will be appreciated that the invention is not limited to the embodiment so that modifications and variations of the embodiment described above will occur to those skilled in the art without departing from the scope and sprit of the invention and in light of the above teachings.

For example, although the principle of the present invention has been shown and described as being applied to the continuously variable transmission in which the transmission ratio is varied in a stepless manner, it may be applied to a toroidal continuously variable transmission in which the transmission ratio is similarly varied in a stepless manner, or to a multi-stage type transmission which has 3 to 5 shift stages and has a lock-up region of a torque converter, set in a shift schedule.

While a temperature of oil to be supplied to the torque converter has not been shown and described in the above embodiment, it will be understood that the following control may be accomplished in connection with the oil temperature: A control for releasing the lock-up condition is executed corresponding to acceleration within an oil temperature range of from a first set oil temperature to a second set oil temperature; and a control for inhibiting the lock-up condition releasing control is executed within a low oil temperature range of not higher than the first set oil temperature and within a high oil temperature range of not lower than the second set oil temperature. As a result, the control for controlling the differential pressure in the torque converter necessary for smoothly releasing the lock-up condition can be prevented from being irregular in a the low oil temperature range, while the oil temperature can be prevented from its further rise due to operation of the torque converter.

Although the vehicle speed and the selected position (range position) of the selector lever have not been shown and described in connection with the control, it will be appreciated that the control for releasing the lock-up condition corresponding to acceleration may be executed within a vehicle speed range between a first set vehicle speed and a second set vehicle speed, or may be executed only in a D (drive) range of the selector lever.

As appreciated from the above, according to the present invention, the lock-up clutch is gradually disengaged from the engaging state and put into the disengaging state when the accelerator pedal movement speed is not lower than the set speed and the initial accelerator pedal depression amount in the accelerator pedal depression amount is not smaller than the set accelerator pedal depression amount to establish the driving condition of the vehicle under the engaging state of the lock-up clutch. With such an arrangement, the driver's acceleration requirement is detected upon the accelerator pedal movement speed being high, and the driving condition is detected upon the accelerator pedal depression amount being not smaller than the set accelerator pedal depression amount. It is assumed that a depression shock is unavoidably produced if the lock-up clutch is immediately released under such a vehicle running condition. However, according to the present invention, the feeling of the depression shock can be suppressed by gradually disengaging the lock-up clutch, while the torque increasing action of the torque converter can be utilized by disengaging the lock-up clutch. Therefore, when the accelerator pedal is depressed during the vehicle running in the lock-up condition, the driver's acceleration requirement can be effectively met while suppressing the feeling of the depression shock due to immediately releasing the lock-up condition.

What is claimed is:

1. A lock-up control system for an automatic transmission including a torque converter having a power input element connected to an engine of a vehicle and a power output element connected to a power input shaft of the transmission, and a lock-up clutch housed in the torque converter and being capable of directly coupling the power input element and the power output element of the torque converter, said lock-up control system comprising:
    an accelerator pedal depression amount sensor for detecting a depression amount of an accelerator pedal; and
    a controller including:
        an accelerator pedal movement speed calculating section for calculating a movement speed of the accelerator pedal,
        a lock-up control section adapted to disengage the lock-up clutch in a condition in which a driving point of the vehicle is within a lock-up condition releasing region in a set lock-up schedule, and to engage the lock-up clutch in a condition in which the driving point is within a lock-up condition applying region, said lock-up control section including a first lock-up releasing control section adapted to gradually disengage the lock-up clutch from an engaging state and put the lock-up clutch into a disengaging state when the accelerator pedal movement speed is not lower than a set speed and an initial accelerator pedal depression amount in the accelerator pedal depression amount is not smaller than a set accelerator pedal depression amount to establish a driving condition of the vehicle under the engaging state of the lock-up clutch.

2. A lock-up control system as claimed in claim 1, wherein said lock-up releasing control section is adapted to set a first set time required from initiation to termination of disengagement of the lock-up clutch, an acceleration response being secured for the first set time, and to output a differential pressure decreasing command based on a preset initial differential pressure and a preset differential pressure decreasing rate, to a lock-up control actuator for controlling a differential pressure to be applied to the lock-up clutch.

3. A lock-up as claimed in claim 1, wherein said lock-up control section includes a second lock-up releasing control section adapted to immediately release the lock-up clutch from an engaging state and put the lock-up clutch into a disengaging state when the accelerator pedal movement speed is not lower than a set speed and an initial accelerator pedal depression amount is smaller than a set accelerator pedal depression amount to establish a coasting condition of the vehicle under the engaging state of the lock-up clutch.

4. A lock-up control system as claimed in claim 2, wherein said lock-up control section includes a third lock-up releasing control section adapted to set a second set time required from initiation to termination of disengagement of the lock-up clutch, the second set time being longer than the first set time, and to output a differential pressure decreasing command requiring the second set time to the lock-up control actuator in order to put the lock-up clutch from the engaging state to the disengaging state, when the lock-up point of the vehicle shifts from the lock-up condition applying region to the lock-up condition releasing region under the engaging state of the lock-up clutch.

5. A lock-up control system as claimed in claim 1, further comprising a sensor for detecting a value corresponding to a rotational speed of a power input shaft of the transmission, wherein said lock-up control section includes a lock-up release control inhibiting section adapted to maintain a lock-up condition of the torque converter and to inhibit a control for releasing the lock-up condition of the torque converter when the value corresponding to the rotational speed of the transmission input shaft is not lower than a set value from which a speed ratio of the torque converter is estimated to become a high speed ratio.

6. A lock-up control system as claimed in claim 1, wherein the automatic transmission is a continuously variable transmission in which a transmission ratio is changeable in a stepless manner, wherein said lock-up control system comprises a vehicle speed sensor for detecting a vehicle speed of the vehicle, wherein said lock-up control section has the lock-up schedule in which the lock-up condition releasing region is limited by a vehicle speed not higher than a set vehicle speed in a vehicle starting range, and the lock-up condition applying region limited by the vehicle speed exceeding the set vehicle speed regardless of the acceleration pedal depression amount, wherein the vehicle speed detected by said vehicle speed sensor is set as the driving point of the vehicle, wherein the lock-up clutch is disengaged when the driving point shifts into the lock-up condition releasing region from the lock-up condition applying region, and the lock-up clutch is engaged when the driving point shifts into the lock-up condition applying region from the lock-up condition releasing region in the lock-up schedule.

7. A lock-up control system for an automatic transmission including a torque converter having a power input element connected to an engine of a vehicle and a power output element connected to a power input shaft of the transmission, and a lock-up clutch housed in the torque converter and being capable of directly coupling the power input element and the power output element of the torque converter, said lock-up control system comprising:
    means for detecting a depression amount of an accelerator pedal;
    means for calculating a movement speed of the accelerator pedal; and
    lock-up control means for disengaging the lock-up clutch in a condition in which a driving point of the vehicle is within a lock-up condition releasing region in a set lock-up schedule, and for engaging the lock-up clutch in a condition in which the driving point is within a lock-up condition applying region, said lock-up control means including a first lock-up releasing control section adapted to gradually disengage the lock-up clutch from an engaging state and put the lock-up clutch into a disengaging state when the accelerator pedal movement speed is not lower than a set speed and an initial accelerator pedal depression amount in the accelerator pedal depression amount is not smaller than a set accelerator pedal depression amount to establish a driving condition of the vehicle under the engaging state of the lock-up clutch.

8. A method of controlling lock-up for an automatic transmission including a torque converter having a power input element connected to an engine of a vehicle and a power output element connected to a power input shaft of the transmission, and a lock-up clutch housed in the torque converter and being capable of directly coupling the power input element and the power output element of the torque converter, said lock-up controlling method comprising:

detecting a depression amount of an accelerator pedal;

calculating a movement speed of the accelerator pedal; and     disengaging the lock-up clutch in a condition in which a driving point of the vehicle is within a lock-up condition releasing region in a set lock-up schedule, and engaging the lock-up clutch in a condition in which the driving point is within a lock-up condition applying region, the disengaging and engaging the lock-up clutch including gradually disengaging the lock-up clutch from an engaging state and put the lock-up clutch into a disengaging state when the accelerator pedal movement speed is not lower than a set speed and an initial accelerator pedal depression amount in the accelerator pedal depression amount is not smaller than a set accelerator pedal depression amount to establish a driving condition of the vehicle under the engaging state of the lock-up clutch.

* * * * *